P. A. KOBER.
PROCESS OF TREATING FLUIDS.
APPLICATION FILED JUNE 10, 1918.
1,409,185.
Patented Mar. 14, 1922.
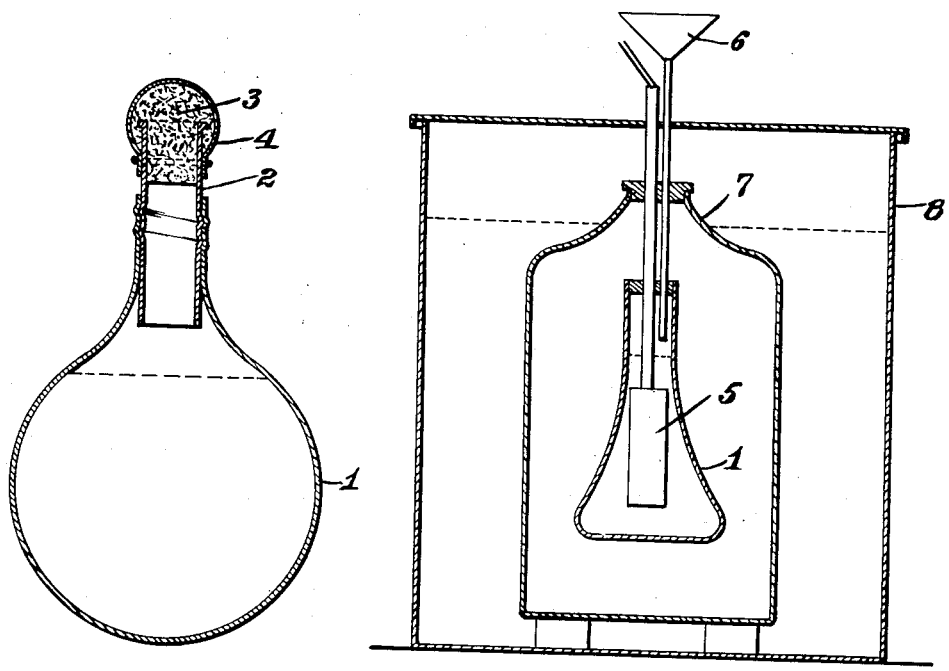
Fig:1.
Fig:2.
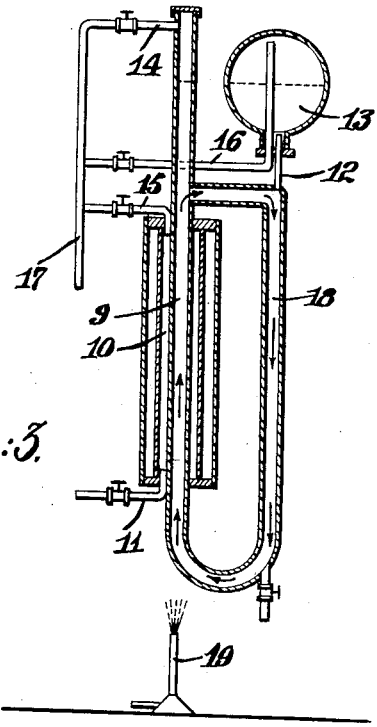
Fig:3.
Inventor
Philip Adolph
Kober

UNITED STATES PATENT OFFICE.

PHILIP ADOLPH KOBER, OF ALBANY, NEW YORK, ASSIGNOR TO KOBER CHEMICAL COMPANY, INC., OF HASTINGS-ON-THE-HUDSON, NEW YORK, A CORPORATION OF NEW YORK.

PROCESS OF TREATING FLUIDS.

1,409,185.                        Specification of Letters Patent.       Patented Mar. 14, 1922.

Application filed June 10, 1918. Serial No. 239,254.

*To all whom it may concern:*

Be it known that PHILIP ADOLPH KOBER, a citizen of the United States, and a resident of Albany, county of Albany, and State of New York, has invented certain new and useful Improvements in Processes of Treating Fluids, of which the following is a specification.

This invention relates to a process of treating liquids, and has particular reference to a process whereby liquids and solutions can be evaporated, concentrated or crystallized by diffusion through a membrane.

I have discovered that certain membranes have the property under special conditions, of permitting the evaporation of liquids contained within such membranes, and also under certain conditions permitting not only the evaporation of a solvent but also the passage of dissolved crystallizable substances. By this discovery, it is possible to rapidly evaporate liquids or concentrate solutions at low temperatures under conditions of absolute cleanliness, and to purify or concentrate solutions containing crystallizable as well as non-crystallizable substances.

My invention has especial application in connection with the preparation of serum, broths, etc., or the concentration of solutions, or the separation of crystalline from non-crystalline substances, and permits of such operations under conditions which prevent access of air or bacteria to the solution being treated. There are so many technical applications of the process that only a few can be mentioned herein, but in general this invention provides a quick, clean and convenient means for obtaining desired products from complex solutions at reasonable temperatures.

I have discovered that certain membranes, either natural or artificial, under certain conditions of moisture, have the property of permitting the passage of both vapors and dissolved crystals. These properties are neither those of filters, nor of dialyzers, nor due to capillarity, but so far as I have been able to discover, depend upon properties peculiar to vapors, and to crystals in solution. For example, water can be evaporated through a proper membrane by heat, faster than it can be boiled away in a glass or metal vessel. Also a saturated solution of crystalline substance can be evaported through a proper membrane and pure crystals recovered on the outside, and no crystals appear until after the solution has become saturated either by open evaporation, or by evaporation through the membrane itself. Again, a mixed solution containing water, a crystallizable constituent, and a non-crystallizable constituent, can be separated, leaving the non-crystallizable constituents within the membrane. Certain membranes possess this property when thoroughly imbibed with water. By the term "condition" as hereinafter employed, I mean causing a thorough imbibition of the membranes by immersion or otherwise thoroughly saturating with water.

One example of the process, which I call spontaneous pervaporation, is to provide a membrane container properly conditioned and put therein a solution containing serum albumin and toluene. The container is tightly closed and suspended in a draft of warm air. After sufficient time, the aqueous layer of solution disappears, leaving the toluene still within the container. In another experiment the solution was composed of sterile meat infusion broth media, which after treatment in a conditioned container by this process was condensed to the consistency, color, and taste, of ordinary extract of beef. Other sterile foods can be similarly treated, as can also toxins and anti-toxins, and be maintained absolutely free of contamination during the treatment. In some instances, the process can be advantageously accelerated by heat without boiling. Where heat is applied the pervaporation is so rapid that the level visibly drops, and the temperature only rises slightly as the surface exposed to the membrane decreases.

The accompanying drawing shows diagrams of apparatus for carrying out the invention, in which, Figure 1 is a diagram of a flask for anaerobic pervaporation without heat, Figure 2 shows a distilling apparatus in which heat is internally applied by an electric heater, and Figure 3 shows an apparatus in which the process can be continuously carried out, with or without a vacuum.

In one experiment, it required 8½ minutes to boil a quantity of water in a glass vessel heated by a Bunsen flame without substantial evaporation. The same volume of water heated in a properly conditioned membrane container for 30 minutes did not boil, but lost over 40 per cent of its original volume by pervaporation.

In another experiment, a saturated solution of ammonium sulphate was placed in a membrane container and fanned in a warm room. At once ammonium sulphate crystallized on the outside and blew off like snow. A similar container was filled with ½ saturated sodium chloride and pervaporated. After ½ of the water had pervaporated, crystals of sodium chloride appeared on the outside. A starch digestion mixture containing hydrochloric acid was pervaporated under the same conditions as previously described. Although the mixture had considerably caramelized, yet a clear practically colorless sugar syrup was obtained. This redissolving of the crystals was due to the extremely hygroscopic maltose which deliquesced.

In another experiment, a protein digestion residue containing strong hydrochloric acid, histidine, and practically black with humin, was pervaporated, and produced white crystals of histidine on the outside of the container.

These experiments demonstrated that by the process of this invention liquids can be concentrated, solvents recovered, crystals separated either from plain solution or from a complex solution containing other non-crystallizable constituents. The crystals obtained are practically dry, unless hygroscopic in themselves, and free from mother liquor.

From my experiments with a number of different membranes, I have concluded that the membranes required for carrying out this process are of the nature of gels, and that liquid or vapor on or in the outer surface of the gels evaporates and the liquid on the inner surface replenishes by diffusion the liquid thus lost. In my experiments, I have usually immersed the container in water so that it has thoroughly imbibed water before starting the process. The containers have preferably been made of collodion, which hardens and becomes impermeable when dry, but when conditioned, hardened or fixed by immersion in water becomes then suitable for my purpose. A simple way of making a collodion membrane is to take a dry clean flask, cover the inside with a film of collodion solution by pouring and draining and then allow the flask to stand inverted until the film has become dry or hard; then fill the flask with water, allow to stand for a short while and on removing the collapsed film it is thoroughly imbibed and ready for pervaporation. I have concluded that water is a constituent of these membranes, either chemically or otherwise, and that the rapid rate of pervaporation indicates that the water also has a vapor pressure at the surface of this membrane. I have observed that if a container having a percrystallized substance on the outside is filled with water, the crystals dissolve through the membranes. Parchment is also a suitable material for making containers. Other membranes capable of pervaporating and percrystallizing various solvents can be employed without departing from the scope of this invention.

In the drawings, Figure 1 shows a container in the form of a flask composed of collodoin, parchment or other gel like material, by means of which pervaporation, perstillation and percrystallization can be carried on. The container 1 is attached to a glass or other neck 2, and can be sealed against admission of air, bacteria, etc., by a closure of cotton 3 and tinfoil 4 to prevent contamination. If the contents are sterilized at the beginning, the residue remains so even during pervaporation, perstillation or percrystallization. If the container is completely filled with liquid and tightly stoppered, these processes can be conducted anærobically, i. e. without air entering the container. The walls of the containers will collapse upon themselves as the processes go on, thus distinguishing the membranes from ordinary porous ware, which would allow air to enter and the level of the liquid within to fall.

In Figure 2, the container 1 is provided with an immersion electric heater 5, and a filling funnel 6. The container is placed within a bottle 7 which is immersed in a tank 8 containing a cooling fluid. By this apparatus, perstillation takes place with a condensation of the solvent in the bottle 7. Instead of electrically heating, steam or other methods of heating may be used.

In Figure 3, a vacuum circulating apparatus is shown consisting of a circulating tube 18 having the portion 9 of the membrane above specified, and contained within the jacket 10, having a draw-off 11. The tube 18 is supplied by pipe 12 from reservoir 13, and a vacuum is maintained in the circulating passage by means of a pipe 14, in the jacket 10 by a pipe 15 and in the reservoir 13 by a pipe 16, all being connected to the common pipe 17 leading to the suction of an air pump or other vacuum producing device. 19 is a Bunsen burner for heating the circulating passage to accelerate the process.

It will be understood that the invention will not be limited to particular liquids nor precise forms of apparatus, as the liquids and apparatus will necessarily be varied according to whether the process is to be used in bacteriological research, or in the commercial preparation of medicinal, chemical or food extracts, or in industrial chemical work where pure residues, crystals or distillates are desired.

What is claimed is:

1. The process which consists in placing an aqueous liquid in a membrane container having the characteristics of a congealed imbibitory gel, and evaporating from the outer surface of the container the liquid passed therethrough.

2. The process which consists in placing an equeous solution of a crystalloid in a membrane container having the characteristics of a congealed imbibitory gel, passing said solution through the container wall and separating the crystalloid and water passed therethrough by evaporating the latter from the external surface of the container wall.

3. The process which consists in conditioning a membrane container having the characteristics of a congealed, imbibitory gel, placing in said container a dilute aqueous solution of a crystalloid, concentrating the solution to saturation, passing the saturated solution through the container wall and separating the crystalloid and the water passed therethrough by evaporating the latter from the external surface of the container wall.

4. The process which consists in wetting with water a membrane container having the characteristics of a congealed imbibitory gel, placing in said container an aqueous liquid and evaporating from the outer surface of the container the water from said liquid.

5. The process which consists in wetting through from side to side with water a collodion container, placing therein a mixed liquid containing water, and passing said water through said container as the water on the exterior thereof evaporates.

6. The process which consists in conditioning a membrane container having the characteristics of a congealed imbibitory gel, placing in said container an aqueous liquid to be treated, evaporating from the outer surface of the container, and condensing the vapor.

7. The process which consists in conditioning a membrane container having the characteristics of a congealed imbibitory gel by saturating said container with water, placing water in said container, and evaporating from the outer surface of the container such water passed therethrough.

8. The process which consists in conditioning a membrane container having the characteristics of a congealed imbibitory gel, placing in said container an aqueous solution containing both crystallizable and non-crystallizable constituents, and passing the aqueous and the crystallizable contents of the solution through the membrane.

9. The process which consists in conditioning a membrane container having the characteristics of a congealed imbibitory gel, placing in said container an aqueous solution containing both crystallizable and non-crystallizable constituents, and passing through the membrane and separately collecting both the aqueous and the crystallizable contents of the solution.

10. A membrane container having the characteristics of a congealed imbibitory gel adapted to be conditioned by being wet through with water, and thereupon adapted to transmit water and crystalloids in solution in the separation of mixed liquids.

Signed at Albany, in the county of Albany and State of New York, this 8th day of June, 1918.

PHILIP ADOLPH KOBER.